(12) United States Patent
Blades

(10) Patent No.: US 11,873,117 B2
(45) Date of Patent: Jan. 16, 2024

(54) AIRCRAFT GLAZING UNIT

(71) Applicant: AIRBUS OPERATIONS LIMITED, Bristol (GB)

(72) Inventor: Paul John Blades, Bristol (GB)

(73) Assignee: Airbus Operations Limited, Bristol (GB)

(*) Notice: Subject to any disclaimer, the term of this patent is extended or adjusted under 35 U.S.C. 154(b) by 720 days.

(21) Appl. No.: 16/721,037

(22) Filed: Dec. 19, 2019

(65) Prior Publication Data

US 2020/0198758 A1 Jun. 25, 2020

(30) Foreign Application Priority Data

Dec. 20, 2018 (GB) .................................... 1820776

(51) Int. Cl.
*B64F 5/60* (2017.01)
*B64D 47/02* (2006.01)
(Continued)

(52) U.S. Cl.
CPC ............ *B64F 5/60* (2017.01); *B23K 26/0622* (2015.10); *B23K 26/53* (2015.10); *B64D 47/02* (2013.01); *B64D 45/00* (2013.01); *B64D 2045/009* (2013.01); *B64F 5/30* (2017.01); *B64F 5/40* (2017.01); *C03C 23/0025* (2013.01); *G01B 11/06* (2013.01); *G01N 21/8803* (2013.01); *G01N 21/958* (2013.01)

(58) Field of Classification Search
CPC ..... B64F 5/60; B64F 5/40; B64F 5/30; B23K 26/0622; B23K 26/53; B64D 47/02; B64D 45/00; B64D 2045/009; C03C 23/0025; G01B 11/06; G01N 21/8803; G01N 21/958

See application file for complete search history.

(56) References Cited

U.S. PATENT DOCUMENTS 3,922,999 A * 12/1975 Meginnis ............... G02B 7/007
    436/3
5,366,577 A * 11/1994 Hart ........................ B32B 27/36
    156/286
(Continued)

FOREIGN PATENT DOCUMENTS

EP      2 457 832          5/2012
EP      2457832 A1    *   5/2012  ............. B64D 45/00
(Continued)

OTHER PUBLICATIONS

European Search Report cited in EP 19213712.3 dated Apr. 30, 2020, 6 pages.
(Continued)

*Primary Examiner* — Donald J Wallace
*Assistant Examiner* — Jalal C Coduroglu
(74) *Attorney, Agent, or Firm* — Nixon & Vanderhye P.C.

(57) ABSTRACT

An aircraft glazing unit including a body of transparent material and at least one subsurface thickness indicator at a predetermined depth within the material. The provision of a subsurface thickness indicator allows for the unit to be re-polished to remove erosion, whilst providing a visual indicator to ground crew of the remaining thickness of material in the unit. In this way, the service lifetime of the glazing unit can be extended.

7 Claims, 5 Drawing Sheets

(51) Int. Cl.
*B23K 26/53* (2014.01)
*B23K 26/0622* (2014.01)
*C03C 23/00* (2006.01)
*G01B 11/06* (2006.01)
*B64F 5/40* (2017.01)
*B64F 5/30* (2017.01)
*B64D 45/00* (2006.01)
*G01N 21/958* (2006.01)
*G01N 21/88* (2006.01)

(56) References Cited

U.S. PATENT DOCUMENTS

| | | | | | |
|---|---|---|---|---|---|
| 5,428,437 | A | * | 6/1995 | Carter | G03G 15/65 |
| | | | | | 492/9 |
| 8,695,527 | B2 | * | 4/2014 | Edmond | B64D 45/00 |
| | | | | | 116/208 |
| 10,059,461 | B2 | * | 8/2018 | O'Kell | G02B 5/128 |
| 2010/0116045 | A1 | * | 5/2010 | Larson | C08J 7/0423 |
| | | | | | 428/209 |
| 2010/0239742 | A1 | * | 9/2010 | Larson-Smith | B64C 1/1484 |
| | | | | | 427/579 |
| 2012/0132129 | A1 | * | 5/2012 | Edmond | B64D 45/00 |
| | | | | | 116/208 |
| 2012/0320621 | A1 | * | 12/2012 | Kleo | B32B 17/1077 |
| | | | | | 362/558 |
| 2013/0048793 | A1 | * | 2/2013 | Edmond | B64D 47/02 |
| | | | | | 244/199.4 |
| 2014/0065395 | A1 | * | 3/2014 | Larson-Smith | B05D 7/04 |
| | | | | | 428/216 |
| 2014/0324384 | A1 | * | 10/2014 | Gay | G01B 7/105 |
| | | | | | 702/170 |
| 2016/0325528 | A1 | * | 11/2016 | Berard | G02B 6/0033 |
| 2017/0015584 | A1 | * | 1/2017 | Krzyzak | C03C 17/00 |
| 2019/0383462 | A1 | * | 12/2019 | Schoen | B64C 1/1484 |
| | | | | | 427/579 |
| 2020/0369007 | A1 | * | 11/2020 | Bauerle | B32B 37/1009 |

FOREIGN PATENT DOCUMENTS

| | | | | |
|---|---|---|---|---|
| EP | 3009351 A1 | * | 4/2016 | B64D 45/00 |
| EP | 3 584 170 | | 12/2019 | |
| EP | 3584170 A1 | * | 12/2019 | B64D 45/00 |
| UA | 77841 U | * | 2/2013 | B64C 1/1484 |
| WO | WO-2008134096 A1 | * | 11/2008 | B05D 7/04 |
| WO | 2011/143471 | | 11/2011 | |
| WO | WO-2011143471 A1 | * | 11/2011 | B44C 1/228 |
| WO | WO-2014168839 A1 | * | 10/2014 | G02B 7/32 |

OTHER PUBLICATIONS

Combined Search and Examination Report for GB1820776.1, dated Jun. 21, 2019, 8 pages.

* cited by examiner

AIRCRAFT GLAZING UNIT

RELATED APPLICATION

This application claims priority to United Kingdom Patent Application GB 1820776.1 filed Dec. 20, 2018, the entirety of which is incorporated by reference.

FIELD OF TECHNOLOGY

This invention relates to a glazing unit on an aircraft, such as the window on a wing light.

BACKGROUND

In order to protect the underlying components from the elements and to provide a smooth aerodynamic surface in flight, aircraft lighting systems comprise aerodynamically shaped glazing panels which cover the lamps and associated components. Such lighting systems are installed on the wings and various other surfaces of the aircraft exposed to the external environment during flight.

The impact of particulate matter and water droplets during flight at very high speeds acts to erode the outer surface of the glazing panel and thus detrimentally affect its transparency. This erosion appears as "clouding" or "misting" of the glazing. As this erosive process continues, the glazing unit degrades and must be replaced before it falls below the transparency standard required for various regulations, such as JAR (Joint Aviation Regulation), FAR (Federal Aviation Regulation) and EASA (European Aviation Safety Agency).

The ability of the glazing unit to allow light to pass through can be estimated visually (by the appearance of the erosion), or light levels can be measured at the exterior of the unit using a light meter or similar device. The former method is subjective and therefore inaccurate, whereas the latter method involves the use of specialist equipment.

EP2457832 proposes a glazing erosion indicator comprising a decal bearing a mark or pattern. The decal may be applied to an interior or exterior surface of the glazing unit. If the decal is applied to an exterior surface then, as the glazing becomes eroded, the decal is worn away so that the mark or pattern disappears. This provides a visual indicator to ground crew that the part needs to be replaced. If the decal is applied to an interior surface of the glazing unit then, as the glazing unit is eroded, the mark or pattern on the decal becomes obscured or indistinct, at which point the ground crew replaces the glazing unit.

The regular replacement of such glazing units is costly and time-consuming. It has been proposed to increase the service life of glazing units by sanding and polishing the eroded areas in order to restore their optical clarity, and thus remove the need for a visual erosion indicator. A problem which may be encountered with this proposal is that the act of polishing the glazing unit removes material from the glazing. There is a concern that repeated polishing could weaken the glazing unit or cause undesirable optical effects.

BRIEF SUMMARY OF THE TECHNOLOGY

The invention provides an aircraft glazing unit comprising a body of transparent material and at least one subsurface thickness indicator at a predetermined depth within the material. The provision of a subsurface thickness indicator allows for the unit to be repolished to remove erosion, whilst providing a visual indicator to ground crew of the remaining thickness of material in the unit. In this way, the service lifetime of the glazing unit can be extended.

Preferably, a plurality of subsurface thickness indicators is provided. These may all be provided at one depth within the material. This allows the ground crew to see that the polishing process is applied selectively over the exterior surface of the unit so as to maintain an even thickness of material.

Alternatively, or additionally, the indicators may be provided at different depths within the material. As a further alternative, the subsurface indicators may be formed of groups of indicators, with all the indicators of a group being at one depth, but the groups themselves being at different respective depths. The provisions of indicators at different depths allows for monitoring of the gradual erosion of the material, so that an estimate of the remaining lifetime of the unit can be made.

Preferably, at least one indicator comprises a mark identifying a minimum allowable thickness of the glazing unit. This allows the ground crew to determine when the unit has reached its end of service.

Advantageously, the, or each, indicator is formed by subsurface laser etching. This allows for precise and accurate mark making within defined regions of the transparent material.

The invention further provides a method of manufacture of an aircraft glazing unit comprising the steps of: focusing a laser beam at a predetermined depth within the body of transparent material; and controlling the laser beam to form at least one subsurface indicator mark.

Preferably, the step of controlling the laser beam comprises pulsing the laser and moving the beam and body relative to each other, so that the, or each, subsurface indicator mark comprises a dot matrix.

Advantageously, the method further comprises the step of focusing the laser beam at different respective predetermined depths within the body of the transparent material; and controlling the laser beam to form subsurface indicator marks at the different respective depths.

The invention also provides a method of maintaining the operation of an aircraft glazing unit comprising the steps of: polishing an exterior surface of the transparent body; and subsequently inspecting the condition of the, or each, subsurface thickness indicator.

Preferably, the method further comprises the step of selectively polishing the exterior surface in dependence on the appearance of the, or each, subsurface thickness indicator. This enables the transparent material to be maintained to a uniform thickness across the glazing unit after polishing.

The aircraft glazing unit of the present invention may be employed in an aircraft light, to protect a lamp or lamps. The aircraft light may form part of an aircraft.

BRIEF DESCRIPTION OF THE DRAWINGS

The invention will now be described, by way of example, with reference to the accompanying drawings in which.

DETAILED DESCRIPTION OF EMBODIMENTS OF THE TECHNOLOGY

Figure 1:
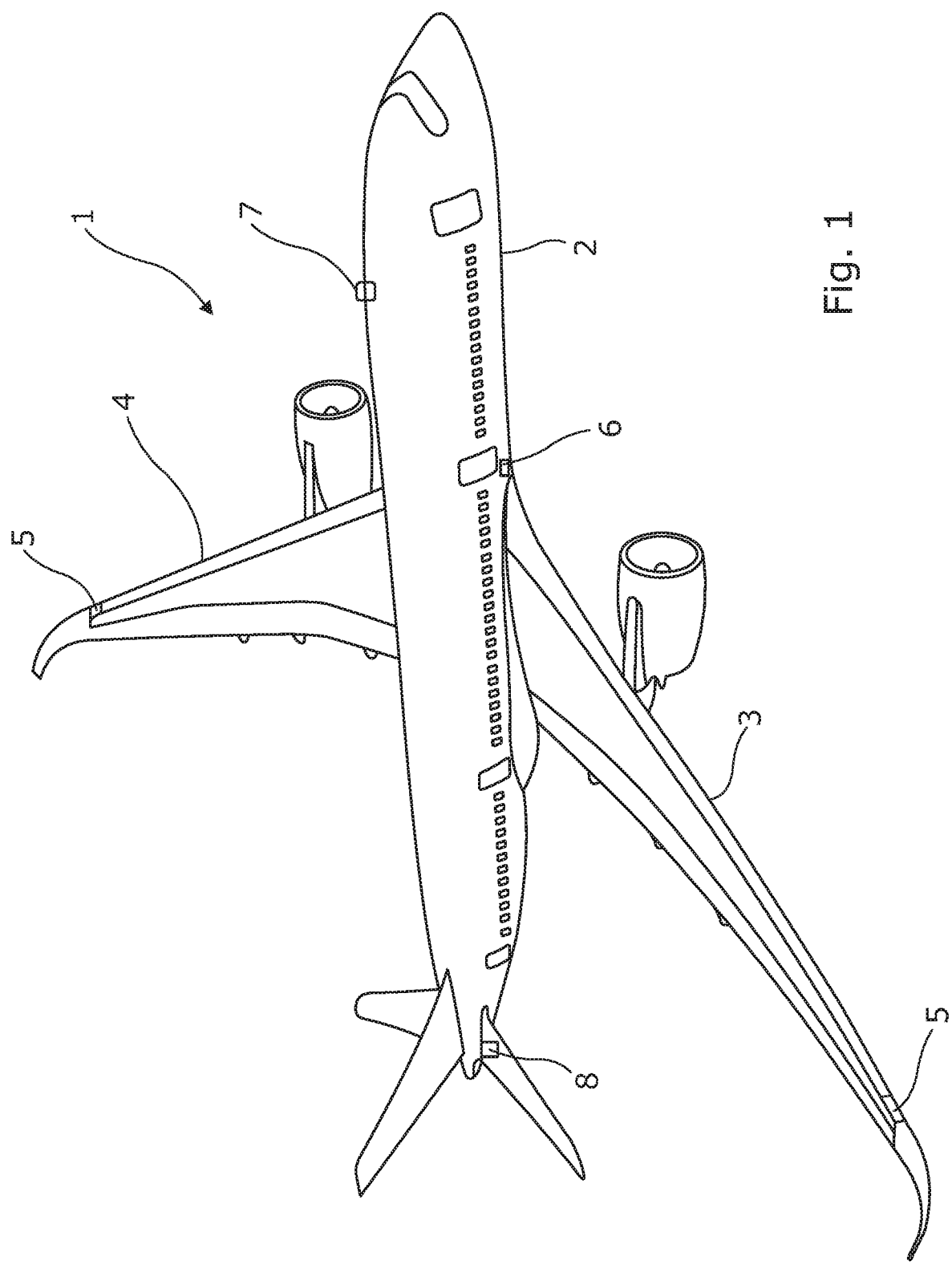
FIG. 1 is a perspective view of an aircraft incorporating a glazing unit constructed according to the invention.
Figure 2:
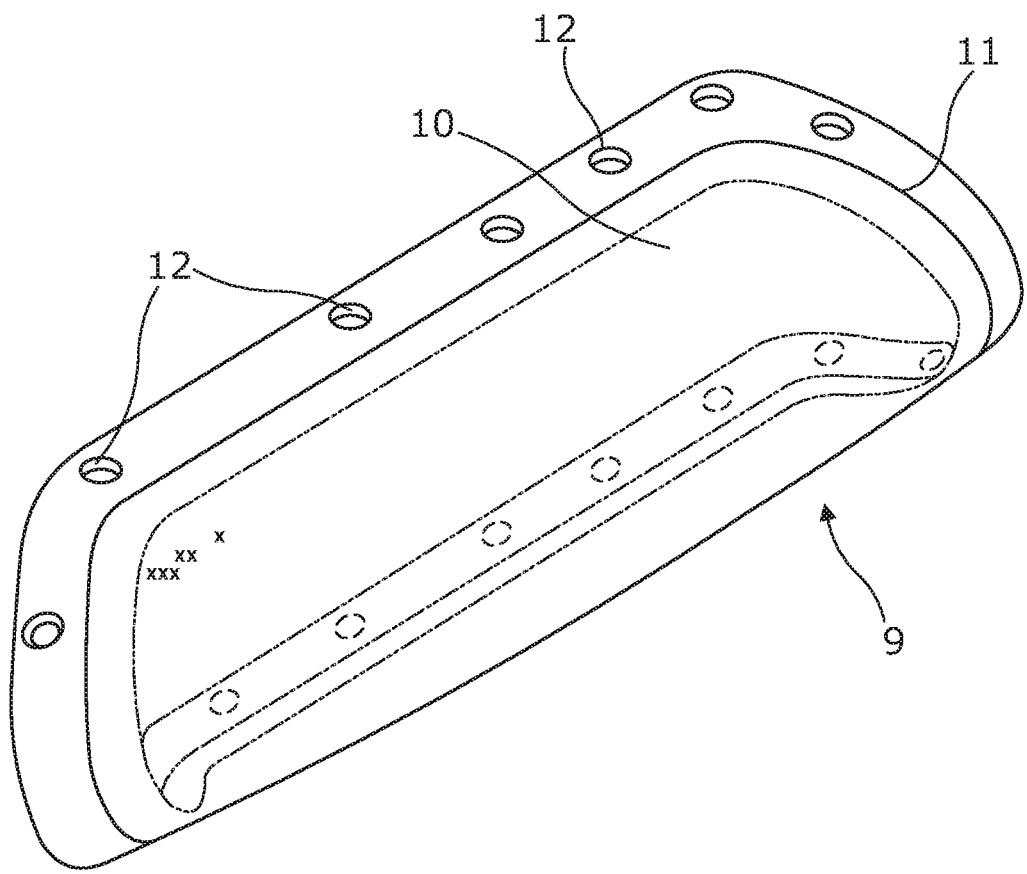
FIG. 2 is a perspective view of a glazing unit constructed according to the invention.

With reference to FIG. 1, an aircraft, indicated generally by the reference numeral 1, is shown. The aircraft 1 comprises a fuselage 2 for holding passengers and cargo, a right (starboard) wing 3 and a left (port) wing 4. This drawing shows some of the locations of glazing units on the aircraft 1. For example, the navigation lights 5 on the wings are protected by glazing units, as are the scan lights on the fuselage (only one of which 6 is visible in the drawing), arranged to shine on the wings for checking ice build-up or inspecting condition of wings during flight. The anti-collision beacon 7 on top of the aircraft is shown in this drawing, as is one of the logo lights 8 on the horizontal stabilizer to illuminate the logo and livery of the airline operating the flight. Each of these lights 4-8 inclusive is protected from the elements by a glazing unit 9 constructed according to the invention, part of an example of which is shown in more detail in FIG. 2.

The glazing unit 9 comprises a curved body 10 constructed from a transparent material, such as polycarbonate. The body 10 is curved to conform to the profile of the aircraft component to which the glazing unit 9 is fitted. The body 10 is mounted in a frame 11, typically of a composite material layered with a metallic strip around the perimeter. Countersunk bores 12 are provided through the frame in order to receive appropriate fasteners. During flight of the aircraft, the material of the body 10 is eroded by particulate matter such as ice, sand and airborne pollutants, so that the transparent body gradually becomes misted or clouded. In order to restore the optical clarity of the glazing unit and thus prolong its service life, the surface of the transparent body 10 is rubbed with progressively finer grades of abrasive paper, and then polished with a fine grade optical polish. The advantage of this polishing process is twofold: it prolongs the service life of the glazing unit 9 and it allows the glazing unit to be maintained in situ, without removing the unit from the aircraft. Each polishing process, however, necessarily removes material from the transparent body 10, so that its thickness reduces. The transparent body must retain a minimum design thickness in order to withstand the rigours of flight.

Figure 3:
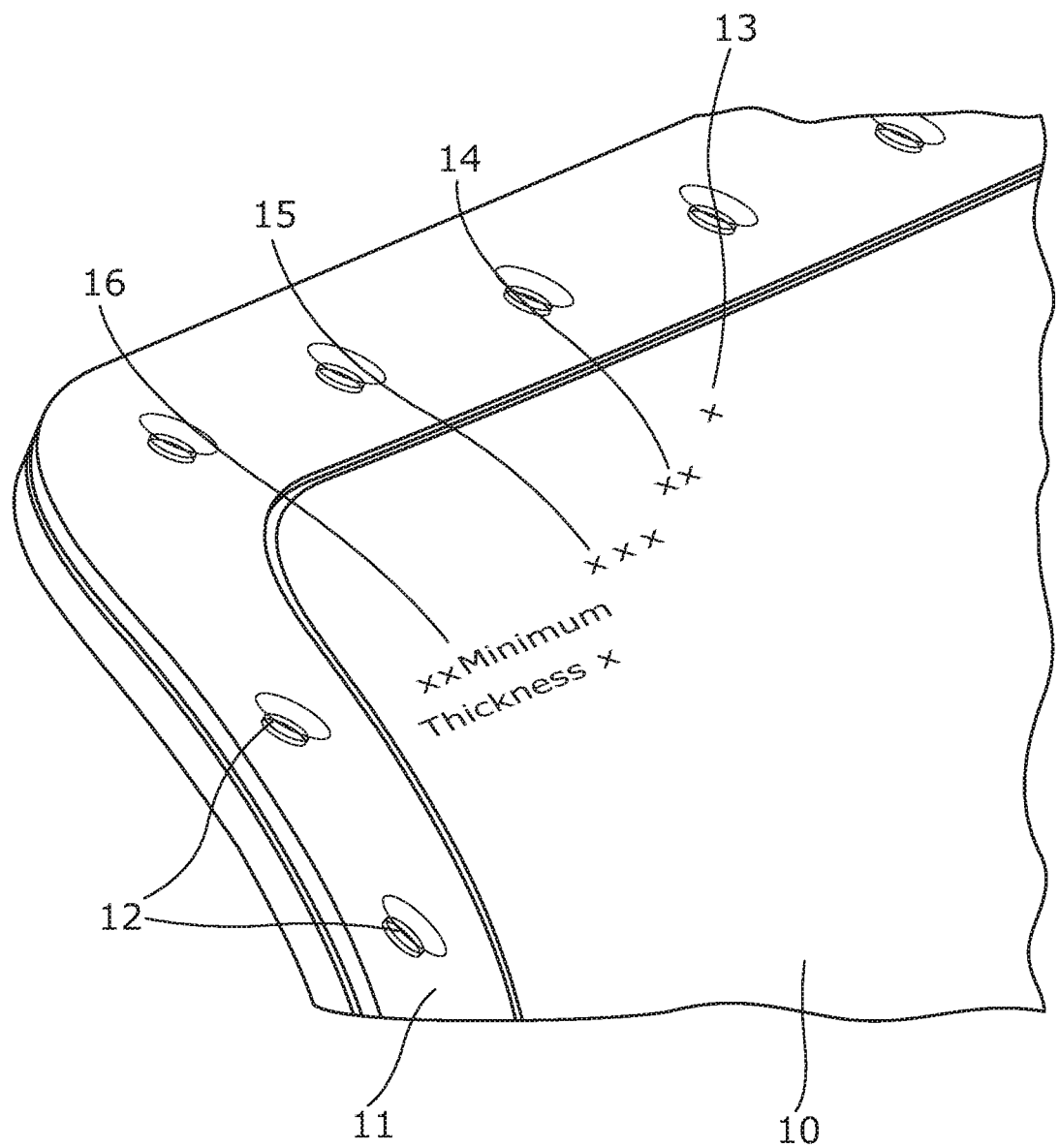
FIG. 3 is a close-up view of part of the glazing unit of FIG. 2.

In accordance with the invention, there is provided a plurality of subsurface thickness indicators in a region of the body 10, which indicators are shown in more detail in FIG. 3. In this embodiment, the body 10 of the glazing unit 9 includes a set of four marks 13-16 at different respective depths within the body. The first mark 13 comprises a single X; the second mark 14, which is deeper within the body than the first mark, is XX the third mark 15, which is at a third predetermined depth, is XXX; and the fourth mark 16 includes the words "Minimum thickness". Over time, as the glazing unit 9 goes through multiple polishing processes, material is gradually removed from the transparent body 10 and, one by one, the marks 13-16 disappear. The gradual removal of the marks 13, 14 and 15 gives an indication of the current thickness of the body 10 and allows the airline to predict the remaining service lifetime of the glazing unit 9. At the stage where the fourth mark 16 begins to be polished away, the unit 9 is scrapped and replaced.

Figure 4:
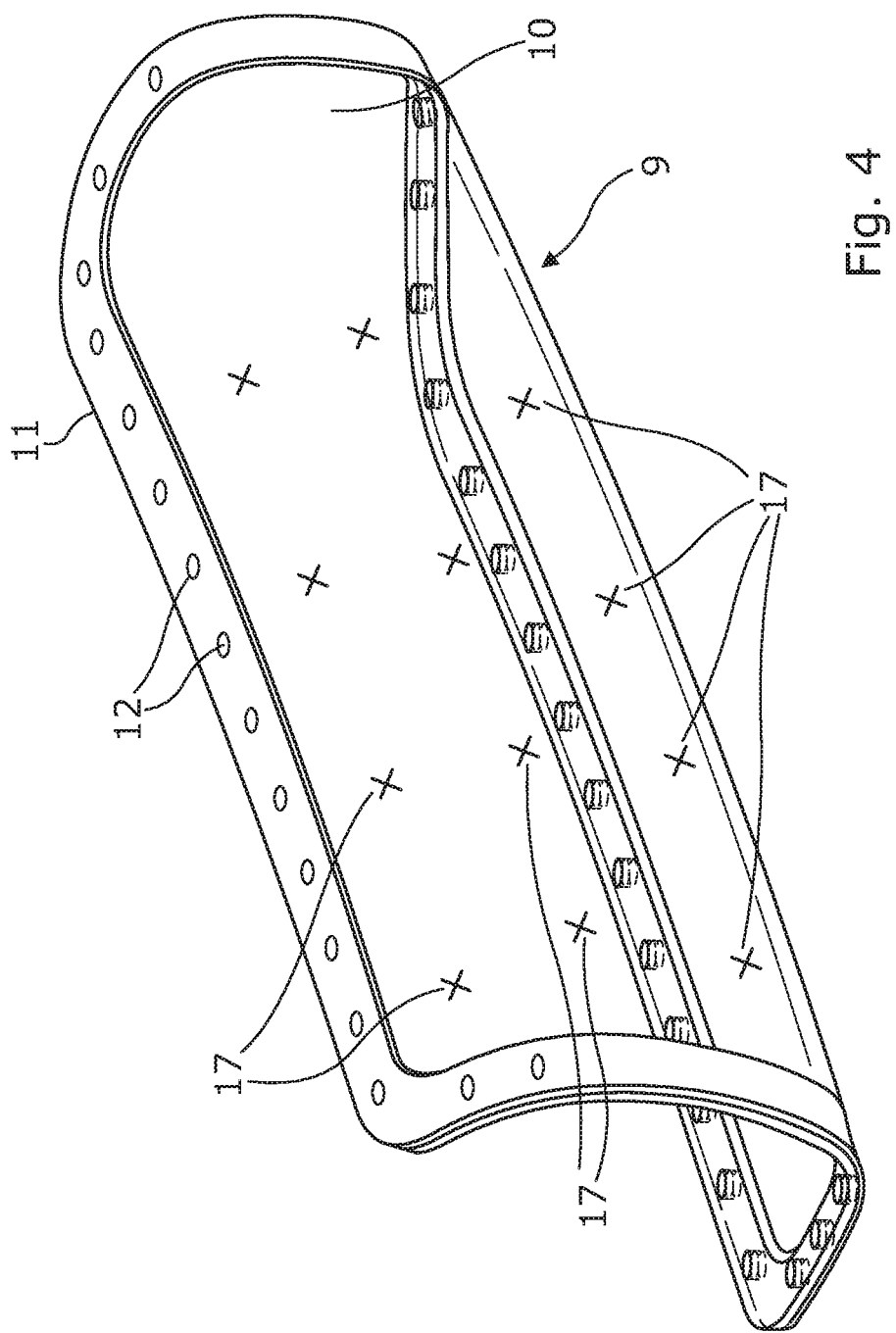
FIG. 4 is a perspective view of an alternative glazing unit constructed according to the invention.

An alternative embodiment of the invention is shown in FIG. 4. The glazing unit 9 comprises a transparent body 10, a frame 11 and countersunk holes 12 adapted to receive fasteners, as before. However, in this embodiment, the transparent body 10 includes a plurality of identical subsurface marks 17 at a predetermined depth of the body. The marks 17 indicate a predetermined remaining thickness of the body 10. The marks 17 form an array of thickness indicators over the width of the body 10. Over time, as the glazing unit 9 is eroded and polished multiple times, the marks 17 are gradually worn away. The array of marks 17 allows an operative to see regions of the body that have eroded and/or been polished more than others. Thus, the operative can apply the polishing process selectively over the exterior surface of the transparent body 10 in order to maintain an even thickness of the body. If the transparent body 10 is of an uneven thickness, this can cause lensing effects and distort the light being emitted.

Figure 5:
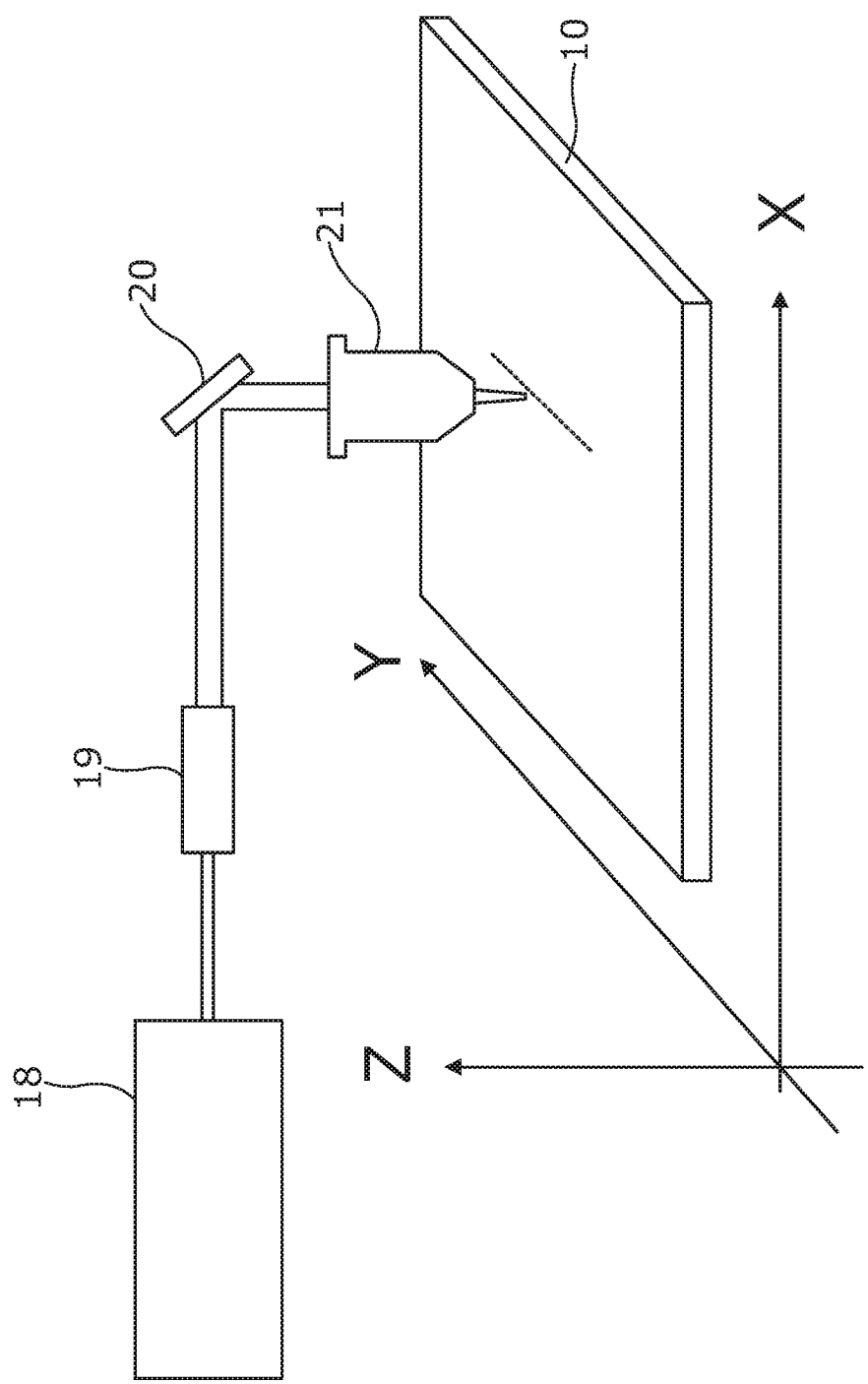
FIG. 5 is a schematic drawing of apparatus suitable for carrying out part of the method of making the glazing unit of FIG. 2, 3 or 4.

Apparatus suitable for making the thickness indicator marks is shown in FIG. 5. The formation of the contour of the transparent body 10 and its frame 11 does not form the basis of this patent application, and any suitable manufacturing method known to the skilled person may be employed. The apparatus comprises a laser 18, light from which is expanded by a beam expander 19. A mirror 20 is provided to redirect light emitted by the beam expander 19 onto the entrance pupil of an optical objective 21. The objective 21 collimates and focuses the laser beam. The transparent body 10 is represented here as a flat plate for clarity. The transparent body 10 is placed on a motion table (not shown) to enable the body to be moved in the x-, y- and z-directions. The body 10 is moved so that the laser light emitted from the objective 21 is incident on the body 10 perpendicularly to its surface and is focused at a predetermined depth within the body. Alternatively, the apparatus 18-21 can be placed on a gantry (not shown) so that it can be moved in the x-, y- and z-directions relative to the transparent body 10.

The collimated laser beam emerging from the objective 21 is focused on a predetermined point within the body 10, causing the material to heat up dramatically and form a micro fracture, which is just about distinguishable to the human eye as a dot of between 40-80 µm diameter, depending on the quality of the optics employed. Each pulse of the laser 18 produces such a dot, and the laser can be pulsed to produce up to 4,000 dots per second. The objective 21 and body 10 are moved relative to each other as the laser 18 is pulsed, so that an array of dots is formed, collectively visible as a mark such as those 13-16 or 17 shown in FIG. 3 or 4. A processor (not shown) is typically provided in order to control the pulsing of the laser 18 and the relative movement of the objective 21 and the body 10.

The apparatus 18-21 may then be controlled so that the laser 18 forms another subsurface indicator mark at a different location in the transparent body 10 at the same predetermined depth. Alternatively, or additionally, the objective 21 may be adjusted so as to focus the collimated laser beam at a different predetermined depth within the transparent body 10. The laser may 18 be pulsed once more as the transparent body 10 is moved relative to it, so that a further subsurface indicator mark is formed at a different predetermined depth within the transparent body.

FIG. 3 shows a series of marks at different predetermined depths, while FIG. 4 shows an array of marks at one predetermined depth. If desired, a combination of the two can be employed, so that the plurality of thickness indicator marks comprises an array of marks at different predetermined depths within the transparent body. Further variations may be made without departing from the scope of the invention. For example, the transparent body may be separated into zones, each zone having different thickness indicators. Some zones of the transparent body may be marked with thickness indicators at different respective depths, with some zones having thickness indicators at one depth. Not all zones of the body need be marked.

The thickness indicators may take the form of any suitable symbols, letters or numbers. Symbols are generally preferred, as they can be understood by ground crew anywhere in the world. For example, a warning sign may be formed in the glazing unit to indicate when the body has been polished to its minimum allowable thickness.

The invention has been described with reference to a transparent body 10 made of polycarbonate. Other suitable materials may be employed for the body, such as acrylic, silicate-based plastics or glass. The body 10 need not be transparent in its entirety; the invention is applicable to transparent regions or zones within such a body. The invention is also applicable to aircraft glazing units other than those used to cover and protect the aircraft lights, such as the protective covers for sensors on the aircraft, aircraft windows or even the windscreen.

The invention claimed is:

1. An aircraft glazing unit comprising a body of transparent material and at least one subsurface thickness indicator at a predetermined depth within the transparent material,
   wherein the at least one subsurface thickness indicator includes a plurality of groups of the subsurface thickness indicators, wherein each of the groups is at a corresponding predetermined depth within the body of the transparent material, and the corresponding predetermined depth for one the groups is different than the corresponding predetermined depth for another one of the groups.

2. The aircraft glazing unit as claimed in claim 1, in which at least one group of the plurality of groups of subsurface thickness indicators include marks identifying a minimum allowable thickness of the glazing unit.

3. The aircraft glazing unit as claimed in claim 1, in which at least one group of the plurality of groups of the subsurface thickness indicators includes laser etched subsurface indicators.

4. The aircraft glazing unit of claim 1, wherein the groups of the subsurface thickness indicators are entirely below a surface of the transparent material.

5. An aircraft glazing unit comprising:
   a body of transparent material,
   a first group of subsurface thickness indicators at a first depth in the body of the transparent material, and
   a second group of subsurface thickness indicator at a second depth in the body of the transparent material, wherein the second depth is deeper than the first depth in the transparent material.

6. The aircraft glazing unit of claim 5, wherein the second depth corresponds to a minimum allowable thickness of the transparent material.

7. The aircraft glazing unit of claim 5, wherein the first group of subsurface thickness indicators and the second group of subsurface thickness indicators are each entirely below a surface of the body of the transparent material.

* * * * *